United States Patent [19]
Lillington

[11] 4,225,864
[45] Sep. 30, 1980

[54] RADAR SIGNAL PROCESSORS

[75] Inventor: John Lillington, Isle of Wight, England

[73] Assignee: Plessey Handel und Investments AG, Zug, Switzerland

[21] Appl. No.: 22,336

[22] Filed: Mar. 20, 1979

Related U.S. Application Data

[63] Continuation of Ser. No. 901,803, May 1, 1978, abandoned.

[30] Foreign Application Priority Data

May 2, 1977 [GB] United Kingdom ............... 52-18359

[51] Int. Cl.² .............................................. G01S 9/42
[52] U.S. Cl. .................................. 343/7.7; 343/5 FT; 343/5 NQ
[58] Field of Search ................... 343/5 FT, 5 NQ, 7.7

[56] References Cited

U.S. PATENT DOCUMENTS

| | | | |
|---|---|---|---|
| 3,665,443 | 5/1972 | Galvin | 343/7.7 X |
| 4,053,885 | 10/1977 | Tomita et al. | 343/7.7 |
| 4,083,049 | 4/1978 | Mattern et al. | 343/7.7 |
| 4,119,966 | 10/1978 | Bouvier et al. | 343/7.7 |
| 4,168,500 | 9/1979 | Brassaw | 343/7.7 |

Primary Examiner—T. H. Tubbesing
Attorney, Agent, or Firm—Fleit & Jacobson

[57] ABSTRACT

Radar signal processor utilizing a technique for detecting targets moving slowly and clutter. The technique comprises dividing the clutter spectrum into a large number of narrow bands and in each band measuring the power ratio between upper and lower side bands. When this ratio exceeds a fixed threshold, the target is declared and, if necessary, its velocity signature can be detailed.

6 Claims, 3 Drawing Figures

RADAR SIGNAL PROCESSORS

This is a continuation of application Ser. No. 901,803, filed May 1, 1978, now abandoned.

This invention relates to radar signal processors and is concerned with a new processing technique for detecting targets moving slowly in a radial direction with respect to a radar set, in clutter, and more especially it is concerned with the problem of detecting targets on the ground.

Targets on the ground are necessarily amid ground clutter. They can usually be detected only by their movement. Detection is difficult when the clutter contains vegetation that moves with the wind especially when the target is moving slowly. The problem is particularly severe when the targets are moving at about the same speed as the clutter.

Various attempts have been made to solve the problem by distinguishing between objects which are progressing and those which are receding with respect to the radar set. These attempts have met with limited success mainly because vegetation does not move sinusoidally and its reflecting area changes as it moves. Various adaptive systems have been used and perhaps the most noteworthy is the Kalmus system wherein the power in upper and lower sidebands of an echo signal are compared and a target is declared when the ratio exceeds a predetermined threshold. However the upper and lower sidebands of the clutter spectrum are not necessarily of equal power and so this sytem is not entirely satisfactory.

According to the present invention we provide a radar system comprising means for producing I and Q video signals, filter means for splitting each of the I and Q video signals into a plurality of different frequency bands so that a pair of I and Q signals are provided for each band, a plurality of comparator means each responsive to a pair of I and Q signals so that one comparator means is provided for each of said frequency bands, said comparator means being operative to compare in each frequency band the power in the upper sideband with the power in the lower sideband to provide an output signal indicative of the ratio therebetween and a plurality of threshold detector means one responsive to each comparator means for providing an output signal indicative of the presence of a target if a predetermined threshold level is exceeded.

Thus the signal processing technique utilized in a system according to the present invention is to divide the clutter spectrum into a plurality of narrow frequency bands, and in each band to measure the power ratio between upper and lower sidebands. When this ratio exceeds a predetermined threshold level a target is delcared and if needed its velocity signature or direction with respect to the radar set can be indicated.

In an analogue system the filter means may comprise a plurality of individual filters so that the filter means comprises a filter bank.

In a digital system however the filter means may comprise a fast fourier transform digital processor.

The comparator means may each comprise a phase quadrature device to which the I signal is fed, a first adder means responsive to the Q signal and the output of the phase quadrature device for providing a signal characteristic of one sideband signal which is fed to first squarer means, a second adder responsive to the Q signal and to the I-signal fed from the phase quadrature device via an inverter for providing a signal characteristic of the other sideband signal which is fed to second squarer means, the first squarer means being arranged to feed via a second inverter a third adder fed also from the second squarer thereby to provide an output signal from the comparator means.

Some exemplary embodiments of the invention will now be described with reference to the accompanying drawings in which.

Figure 1:
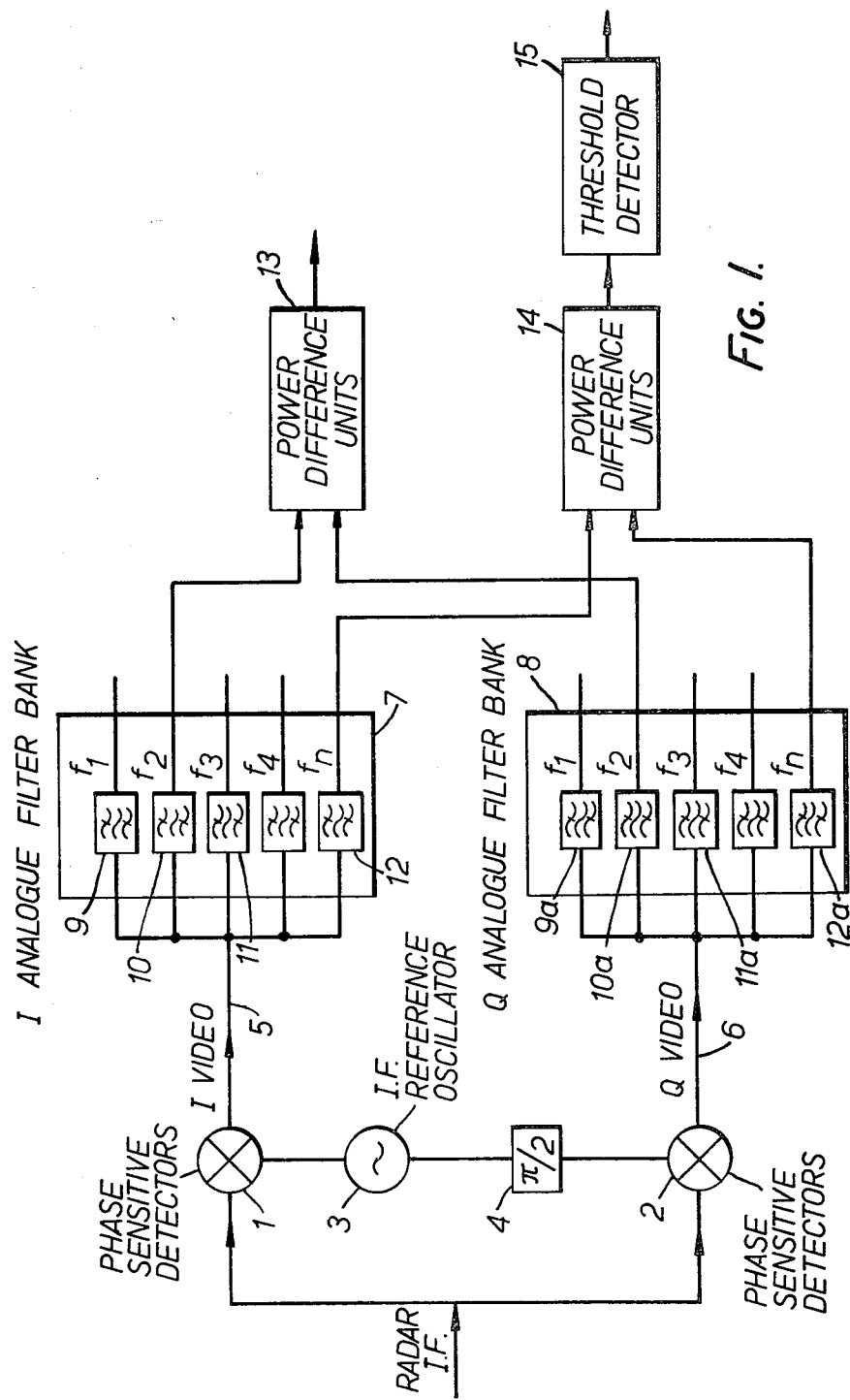
FIG. 1 is a generally schematic block diagram of a part of a radar system showing development of the I and Q signals and subsequent processing in an analogue manner.
Figure 3:
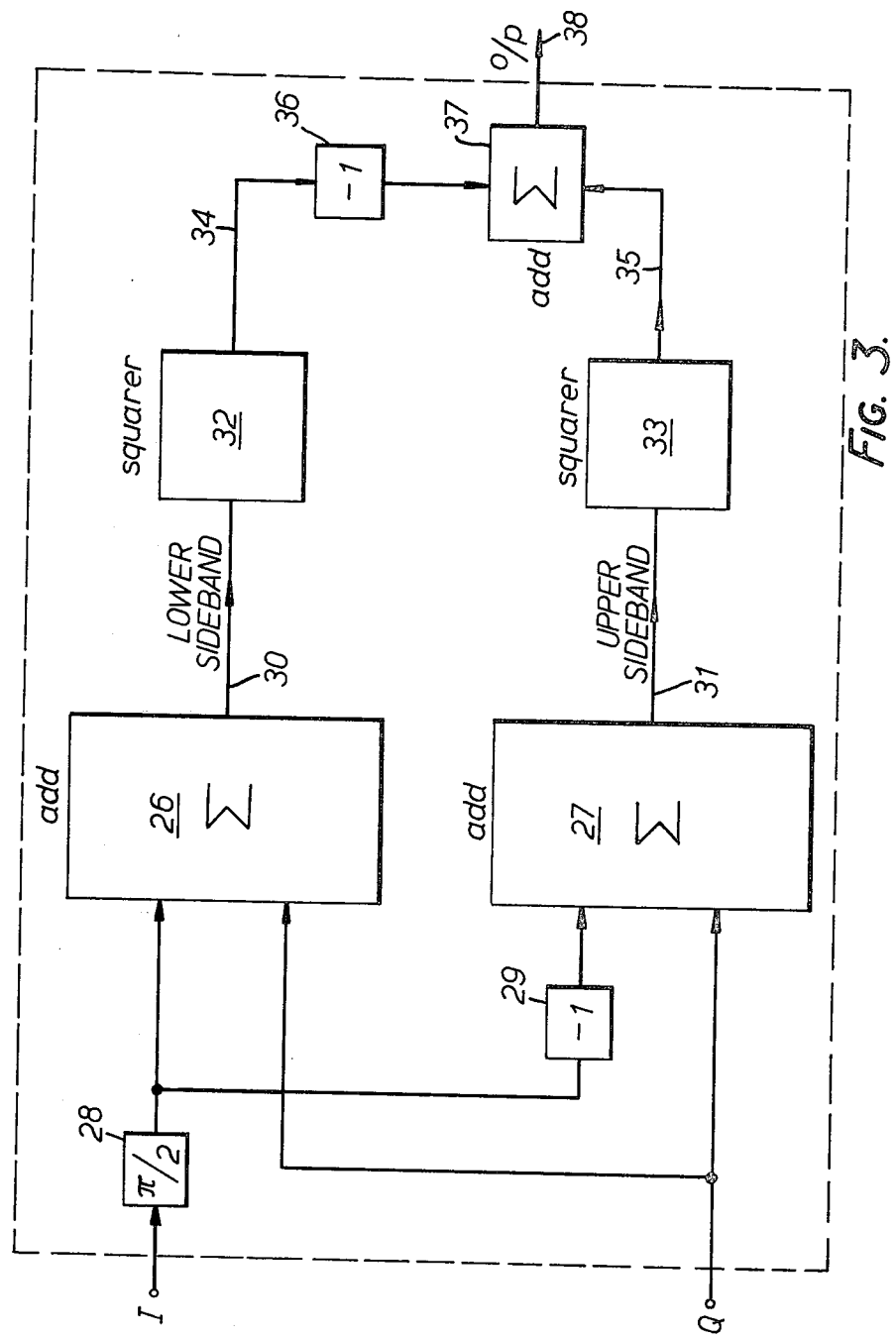
FIG. 3 is a generally schematic block diagram of parts of the block diagram of FIGS. 1 and 2.

Referring now to FIG. 1 a radar I.F. signal is fed to a pair of phase sensitive detectors 1 and 2 which are fed with an intermediate frequency reference oscillator signal from an oscillator 3. The oscillator 3 feeds the phase sensitive detector 1 directly and the phase sensitive detector 2 via a phase quadrature network 4. Thus baseband I and Q video signals are provided at the output of the phase sensitive detectors 1 and 2 on lines 5 and 6 respectively. The signals 5 and 6 are fed to filter banks 7 and 8 respectively which each include a number of bandpass filters 9, 10, 11, 12 and 9a, 10a, 11a and 12a. Although in the drawing each filter bank is shown to include five filters very many more filters may be in practice provided. The filters 9, 10, 11 and 12 are arranged to occupy adjacent and overlapping bands so as completely to cover the required bandwidth. In practice each filter may cover a bandwidth of 10 Hz and a total bandwidth of around 400 Hz may be covered with a centre frequency at around 200 Hz. Although the frequency is substantially baseband the lowest frequency of interest in practice might be about 20 Hz. Corresponding pairs of output signals from the filters are fed each to a power difference circuit such as the power difference circuits 13 and 14 shown. Thus the power difference circuit 13 is fed from the filters 10 and 10a and the power difference circuit 14 is fed from the filters 12 and 12a. Thus one power difference circuit will be provided for each pair of filters and each power difference circuit will be fed with I and Q signals in a very narrow frequency band. The power difference circuit, which will be later described in more detail with reference to FIG. 3, is operative to compare the power in the upper sideband with power in the lower sideband to provide a positive or negative signal output depending upon which power is greater. Each power difference circuit is arranged to feed a threshold detector only one of which referenced 15 is shown. The threshold circuit provides an output signal if the input signal from its associated power difference circuit 14 exceeds a predetermined threshold level. In practice the threshold detectors are bipolar devices such that an output signal is provided if the input signal exceeds the threshold level in a positive or in a negative direction. Thus an output signal from each threshold detector is provided if a target is indicated within the bandwidth of its associated filter and the polarity of the output signal will indicate in which direction the target is moving i.e. towards or away from the radar set. It will be appreciated that the speed in a radial direction with respect to the radar set will be also indicated in dependence upon which filter receives the signal providing an output indication. Thus the nominal radar frequency might be equivalent to the 200 Hz centre frequency and signals appearing in the sidebands will correspond to doppler shifted signals such that the further such signals are away from the 200 Hz nominal centre frequency then the greater will be their radial speed relative to the radar set.

Figure 2:
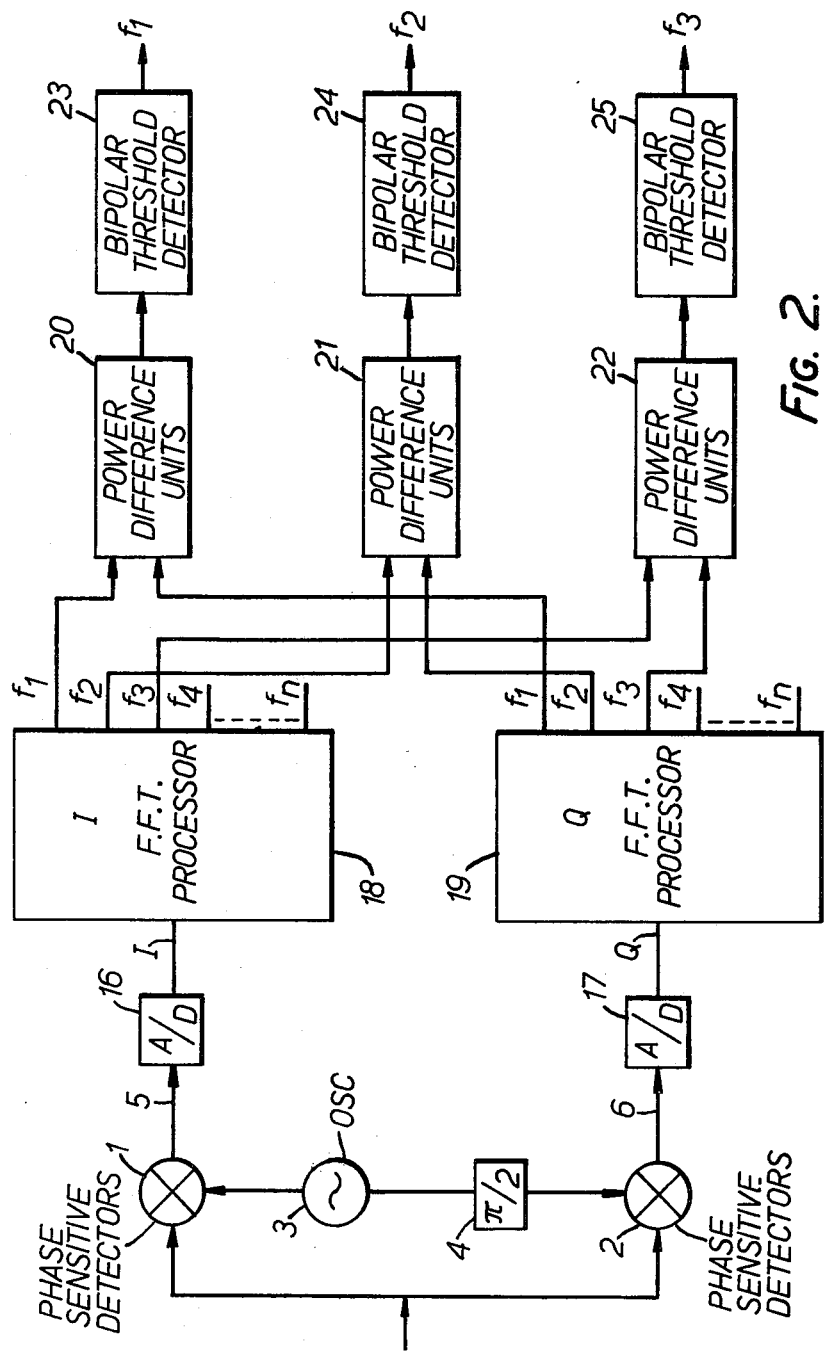
FIG. 2 is a similar block diagram to the block diagram of FIG. 1 showing an arrangement for radar signal processing in a digital manner.

In order to provide for digital processing an arrangement is provided as shown in FIG. 2 wherein corresponding parts carry the same numerical designation as FIG. 1. In FIG. 2 the I and Q signals on lines 5 and 6 respectively are fed to analogue to digital converters 16 and 17 which are arranged to feed faster fourier transform processors 18 and 19 respectively. The fast fourier processors 18 and 19 operate to provide a similar result to the filter banks 8 and 9 as shown in FIG. 1 and produce a corresponding number of frequency output signals wherein I and Q signals are provided for each of a number of frequency bands. As described with reference to FIG. 1 corresponding signals I and Q in each band are fed to power difference circuits 20, 21 and 22 only three of which are shown and these circuits are arranged to feed bipolar threshold detectors 23, 24 and 25. It will be appreciated however that the power difference circuits and bipolar threshold detectors are provided for each pair of frequency output signals from the processors 18 and 19. The circuit as just before described with reference to FIG. 2 operates in a precisely analogous manner to the analogue processor described with reference to FIG. 1. The power difference circuit 13, 14 or 20, 21, 22 may be constructed as described with reference to FIG. 3.

Referring now to FIG. 3 the I signal from a filter bank and the corresponding Q signal are fed to a pair of adders 26, 27, the I signal being fed via a phase quadrature device 28. The output of the phase quadrature device 28 is fed directly to the adder 26 with a Q signal and to the adder 27 via a phase inverter 29 the adder 27 being fed also with a Q signal. Signals corresponding to the lower and upper sideband respectively are thus provided on lines 30 and 31 which are fed to squarers 32 and 33 to provide on output lines 34 and 35 signals corresponding to the power in the upper and lower sideband respectively. The signal on line 34 is fed via a phase inverter 36 to a summing device 37 which is fed also via the line 35 to provide an output signal on line 38. Thus it will be appreciated that the sense of the signal on the line 38 will indicate the direction of movement of the target with respect to the radar set. Signals on the line 38 are fed to an associated bipolar threshold detector such as the detector 15 or the detectors 23-25 one of which is provided for each pair of filters. Bipolar threshold detectors are well known and may be fabricated in any conventional manner.

The performance of a radar set using the new technique has been calculated using target and clutter data believed to represent all types of ground clutter and all likely meteorological conditions. In clutter where the target and clutter spectro overlap a radar using the new technique can be expected to detect a moving man with a sub clutter visibility of $-45$ dB. The corresponding figure for a radar with Kalmus filtering would be about $-30$ dB and for a pulse doppler radar very much less.

What we claim is:

1. A radar system comprising means for producing I and Q video signals, filter means for dividing each of the I and Q video signals into a plurality of different frequency bands so that a pair of divided I and Q signals are provided for each band, a plurality of comparator means each responsive to a pair of divided I and Q signals appertaining to a restricted frequency band so that one comparator means is provided for each of said frequency bands, said comparator means being operative to compare for each frequency band the spectral power in the upper sideband with the spectral power in the lower sideband and to provide an output signal indicative of the ratio therebetween and a plurality of threshold detector means one responsive to each comparator means for providing an output signal indicative of the presence of a target if a predetermined threshold level is exceeded.

2. A radar system as claimed in claim 1, wherein the filter means comprises a plurality of individual analogue filters.

3. A radar system as claimed in claim 1, wherein the filter means comprises a fast fourier transform digital processor.

4. A radar system as claimed in any preceding claim, wherein the comparator means each comprise a phase quadrature device to which a divided I signal is fed, a first adder means responsive to a corresponding divided Q signal and to the output of the phase quadrature device for providing a signal characteristic of one sideband spectrum which is fed to a first squarer means, a second adder responsive to the divided Q signal and to the divided I signal fed from the phase quadrature device via an inverter for providing a signal characteristic of the other sideband spectrum which is fed to a second squarer means, the first squarer means being arranged to feed via a second inverter a third adder fed also from the second squarer thereby to provide an output signal from the comparator means.

5. A radar system as claimed in any of claims 1-3 wherein the threshold detector means each comprise a bipolar threshold detector.

6. A radar system comprising filter means for dividing radar video signals into a plurality of different frequency bands representing pairs of upper and lower side bands, a plurality of comparator means each responsive to a pair of upper and lower side bands so that one comparator means is provided for each pair of said side bands, said comparator means being operative to compare the spectral power in each upper side band with the spectral power in each corresponding lower side band, and threshold detector means responsive to said comparator means for providing an output signal indicative of the presence of a target if a comparator output signal exceeds a predetermined threshold level.

* * * * *